Nov. 25, 1958          H. T. KUCERA          2,862,081
HEAT CONTROL APPARATUS CONTROLLED BY OUTSIDE TEMPERATURE
Original Filed Aug. 29, 1952          2 Sheets-Sheet 1
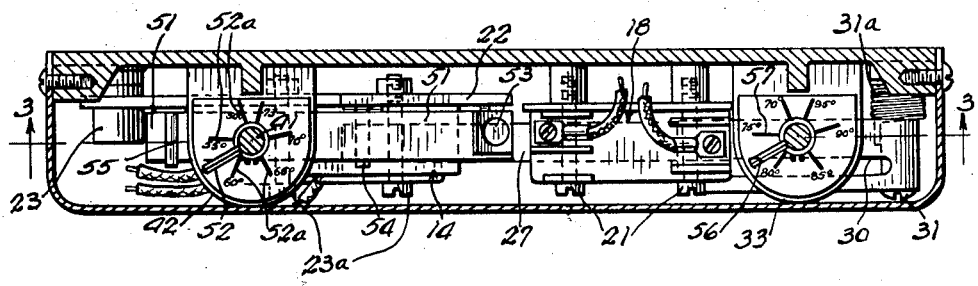
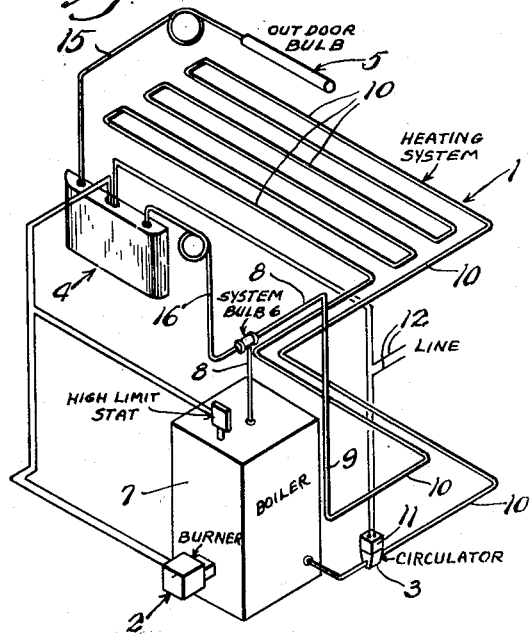
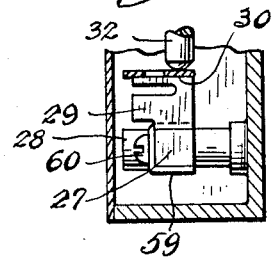
INVENTOR.
Henry T. Kucera.

Nov. 25, 1958 H. T. KUCERA 2,862,081
HEAT CONTROL APPARATUS CONTROLLED BY OUTSIDE TEMPERATURE
Original Filed Aug. 29, 1952 2 Sheets-Sheet 2

INVENTOR.
Henry T. Kucera.
BY
Thiess, Olson, Mecklenburger,
van Holst, & Coltman.
ATTYS.

United States Patent Office 2,862,081
Patented Nov. 25, 1958

2,862,081

HEAT CONTROL APPARATUS CONTROLLED BY OUTSIDE TEMPERATURE

Henry T. Kucera, La Grange, Ill.

Original application August 29, 1952, Serial No. 307,001, now Patent No. 2,778,575, dated January 22, 1957. Divided and this application November 13, 1956, Serial No. 621,692

16 Claims. (Cl. 200—140)

This invention relates to heat control apparatus controlled by outside temperature, functioning to control and vary the temperature of the heating medium in a heating or cooling system as temperatures external of the space to be heated or cooled, vary.

This application is a division of my copending application Serial No. 307,001, filed August 29, 1952, Patent No. 2,778,575 dated January 22, 1957.

One object of the invention is to provide a heat transfer controlling device that will vary the temperature of the heating medium as temperatures external of the space to be heated vary, said device comprising means for changing the degree of change of heating medium temperature per degree of temperature change of the space external of the space to be heated, and variable means for restricting the flow of heat units into the heating medium when a preset level of temperature is reached external of the space to be heated and circuit controlling apparatus for controlling the circulation of the heating medium with adjustment thereof to restrict circulation when a preset level of temperature of the heating medium is reached.

A further object of the invention is to provide a heat transfer controlling device arranged and constructed to change the degree or rate of change of the temperature of the heating medium, thereby maintaining the same limits of temperature of the heating medium when the range of temperature external of the space to be heated through which the controlling device is to be effective, is changed.

A further object is to provide a heat transfer controlling device having means for varying the range of temperature of the heating medium without affecting the limits of the temperature external to the space to be heated through which the controlling device is to be effective.

A further object is to provide a heat transfer controlling device having means for varying the temperature level external of the space to be heated at which heat units will be admitted to or taken from the heating medium.

A further object of the invention is to provide a heat transfer controlling device having means for varying the rate of heat transfer to a space as temperatures external of the space to be heated or cooled change, and combining therewith circuit controlling means to restrict the circulation of the heating medium having simple means for setting the point of restriction at any desired level of heating medium temperature.

A further object of the invention is to provide a heat transfer controlling device suitable for regulating heat transfer to a space in accordance with changes of temperature external to the space and to provide adjustments therein to adapt the one control to the varying limits required in various geographical areas and limits required because of the type of heating system, type or occupancy of the space being heated with the scale readings of each of the adjustments provided being in actual temperatures.

Further objects and advantages of the invention will be apparent from the description and claims.

In the drawings, in which an embodiment of my invention is shown,

Figure 1 is a perspective view showing a heating installation and controls therefor, controlled by outside temperature and by the temperature of the heating medium;

Fig. 4 is a longitudinal horizontal sectional view on the line 4—4 of Fig. 2, and Fig. 5 is a detail sectional view on the line 5—5 of Fig. 2.

Figures 2, 3:
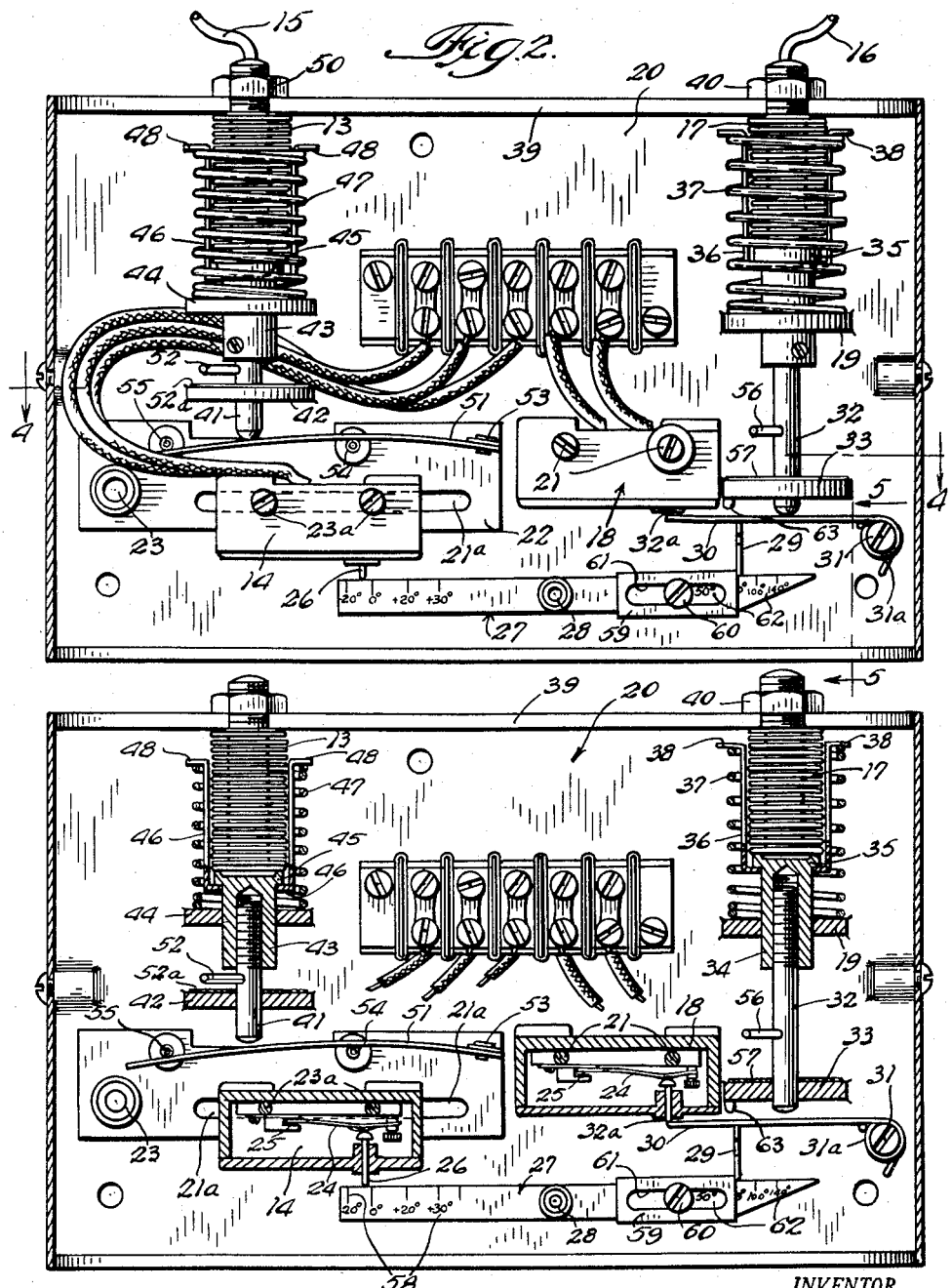
Fig. 2 is an elevational view of the control apparatus used in connection with the installation.
Fig. 3 is a vertical longitudinal section of the control apparatus on the line 3—3 of Fig. 4.

Referring to the drawings in detail, the construction shown comprises a heating or cooling system 1 for the circulation of a fluid heating or cooling medium (for example, water, steam or air), an electrically controlled heater or cooler 2 (for example, oil, gas, cold or cool air or water), an electrically controlled circulator 3 for causing circulation of the heating or cooling medium, and control apparatus 4 for controlling the action of the heater or cooler and circulator.

The control apparatus 4 comprises, in part, two thermometric bulbs 5 and 6, one bulb 5 being controlled by temperature outside the space to be heated or cooled, and bulb 6 being inserted in the heating or cooling system or subjected to the temperature of the heating or cooling medium.

While, as indicated above, the combination can be designed for use with various types of apparatus, it will be described in detail with a hot water heating and gas burning system.

The heating system 1 extends from the upper end of the container 7 for the heating medium through the pipes 8, 9, and 10, to the circulator 3 and back to the container 7. The circulator 3 is driven from an electric motor 11 connected with the line 12.

The outside or outdoor thermometric bulb is connected with the thermometric bellows 13, Figs. 2 and 3, which controls the burner controlling switch 14, through a conduit 15. The outside bulb 5 may be located outside the space to be heated; for example, outside the building to be heated, so that the volume of the heat expansible liquid inside the thermometric bellows 13 and bulb 5 will be determined by the temperature outside the space to be heated. The thermometric system bulb 6 may be inserted in a T-coupling, located in the piping 8 above the container 7 so that the bulb will be exposed to the high temperature of heating medium in the heating system 1 and so that the volume of the heat expansible liquid inside the thermometric bellows 17 and bulb 6 will be determined by the temperature of the liquid in the heating system. The system controlling bulb 6 is connected by a liquid conduit 16 with the thermometric bellows 17 which controls the switch 18 for the motor 11 of the circulator 3.

The switch 18 which controls the motor 11 is mounted in fixed position on the base 20 of the control apparatus 4 by means of cap screws 21. The switch 14 which controls the operation of the burner 2 is slidably mounted for longitudinal adjustment along a slot 21a in a rock arm 22 mounted to rock about a trunnion or fulcrum 23 secured to the base 20. The switch 14 may be held in longitudinally adjusted position by the cap screws 23a.

Each of the switches 14 and 18 is a micrometer switch. The parts of these switches are so similar that similar reference characters can be used in describing both. Each comprises a buckling leaf spring 24 movable past a dead center to cause a snap action of the movable switch contact 25 from one position to another. The switch may, if desired, be constructed so that the movement of the push button 26, necessary to effect snap action of the switch 14, may be less than one thousandth of an inch. The construction is such that depression of the push button 26 with respect to the switch 14 will open the switch 14 to turn the heat off, and release of the push button will close the switch to turn the heat on.

The downward movement of the push button 26 of the switch 14 about the fulcrum 23 is limited by its engagement with the left-hand arm of a two-armed lever 27 (Figs. 2, 3, and 4), rockable about a trunnion or fulcrum at 28, the right-hand arm of this rock lever being limited by the engagement of a finger 29 (Figs. 2, 3, and 5) secured to the right-hand arm of the lever 27 with a rock arm 30 mounted on a trunnion 31 on the base 20. This rock arm is urged upwardly by a coil torsion spring 31a. The upward movement of this arm 30 is limited either by its engagement with a plunger 32, slidable in a lower right-hand bracket 33 on the base 20, and positioned by the action of the system bulb 6 or by its engagement with the push button 32a of the fixedly mounted switch 18.

For purposes hereinafter set forth, the thermometric system plunger 32 is adjustably mounted in a plunger hub or head 34 slidably mounted in the upper right-hand bracket 19. This plunger head 34 has a flange 35 at its upper end seated in a yoke 36 which is spring pressed upwardly by means of a coil compression spring 37. This coil compression spring 37 engages flanges 38 on the yoke 36 at its upper end and engages the bracket 19 at its lower end. The thermometric plunger head 34 is provided with a recess to receive the lower end of the thermometric bellows 17. The upper end of this bellows 17 is clamped in place on the upper flange 39 of the base 20 by means of a nut 40.

In a similar manner, the thermometric plunger 41 which controls the burner switch 14 is slidably mounted in the lower left-hand bracket 42 and is adjustably mounted in a plunger head 43 which is slidably mounted in the upper left-hand shelf or bracket 44 on the base 20. This plunger head 43 has an annular flange 45 seated on the lower portion of the yoke 46. The yoke, plunger head, and plunger are pressed upwardly by means of a coil compression spring 47. The upper end of this spring 47 engages flanges 48 at the upper end of the yoke 46. The lower end of the spring 47 engages the upper left-hand bracket 44 on the base 20. The upper end of the plunger head is provided with a recess to receive the lower portion of the bellows 13. The bellows 13 is secured to the upper flange 39 by means of a nut 50 threaded on the upper end of the bellows.

Whenever the circulator 3 is not operating, the arm 30 is pressed by the spring 31a against the push button 32a of the switch 18 and the upper edge of the finger 29 is in engagement with the lower face of the arm 30. Under these conditions the lower face of the arm 30 will be parallel to the upper edge of the two-arm lever 27 and to the slot 21a in the rock arm 22, in which slot the burner switch 14 is mounted for lateral adjustment. In this position neither lateral adjustment of the switch 14 on the rock arm 22 nor lateral adjustment of the finger 29 on the rock lever 27 would change the time at which the switch 14 would be closed by change in outside temperature, to cut off the heat supply.

As explained hereinafter, this time of switch closing will be affected by outside temperature if the circulation switch control arm 30 has been depressed away from the circulator switch controlling button 32a.

There are four manual adjustments or controls which affect the temperature-controlled operations of the switches 14 and 18. A first control relates to vertical adjustment of the burner controlling thermometric plunger 41 with respect to the plunger hub 43. A second control relates to a vertical adjustment of the circulator controlling plunger 32 with respect to the thermometric plunger hub 34. A third adjustment relates to the lateral adjustment of the heater control switch on the rock arm 22. A fourth adjustment relates to a lateral adjustment of the finger 29 along the rock lever 27.

The first adjustment relates in general to the degree of the outside temperature at which the burner control switch 14 will be turned on and off.

The second adjustment relates to the degree of heating medium temperature at which the switch 18 will be operated to start or stop the circulation pump 3.

The third adjustment relates to the degree of outside temperature at which the push button 26 of the switch 14 will be caused to open and close by the engagement and disengagement of the plunger 41 with respect to the yieldable leaf spring 51 mounted on the switch carrying lever 22 as affected by the manual longitudinal adjustment of the switch 14 along the switch carrying arm 22.

The fourth adjustment relates to the degree of outside temperature at which the heater control switch 14 will operate as indicated above, as affected by the manual adjustment of the finger 29 along the rock lever 27.

Assume an outside temperature of 50 degrees, which is below the adjusted 65-degree burner cut-off setting on the scale 52a, to exist. Assume a temperature of system fluid of 75 degrees, which is below the adjusted circulation pump cut-off setting of 80 degrees on the scale 57, to exist. Under these conditions the burner 2 will be on and the pump 3 will be off. The temperature of the system will rise.

When the system fluid reaches the selected cut-off temperature of 80 degrees, the thermometric plunger 32 will start the pump circulating the fluid through the heating system 10. The burner 2 will still be on, as the outside temperature thermometric plunger 41 is still not in engagement with the spring abutment 51 on the switch supporting rock arm 22. As the burner and pump continue to operate, the temperature of the fluid in the system will rise above the 80-degree temperature at which the circulator starts to operate, causing the switch carrying arm 22 and switch 14 to rock upwardly about the pivot 23. The system fluid temperature will continue to rise until the spring abutment 51 engages the thermometric plunger 41, thus stopping the further upward movement of the switch carrying arm and switch 14. The burner 2 will cause the system temperature to continue to increase until the thermometric plunger 32 has moved downwardly enough to cause the operation of the switch button 26 to turn off the burner 2. The burner will remain off until the circulation fluid in the system has cooled sufficiently to cause the thermometric plunger 32 to rise far enough to release the push button 26 to start the burner operation. The time of starting and stopping the burner is determined in part at least by the setting of the indicators 26 and 29 with respect to the scales 58 and 62, respectively, which determines the effective lengths of the arms of the rock lever 27. Assuming a rise in outside temperature to a point above the 65-degree burner cut-off setting on the scale 52a which condition would prevent further operation of burner 2, the system fluid will continue to circulate and cool off, causing the thermometric plunger 32 and upwardly spring-pressed rock arm 30 to rise until the temperature of the fluid drops to about 80 degrees, corresponding to the setting of the indicator 56. At about this temperature, the spring-pressed arm 30 will operate the push button 32a of the circulator switch 18 to stop the circulator 3.

Referring to the first control for the burner 2, this adjustment is effected by screwing the thermometric plunger 41 into or out of the plunger 45 by means of an index finger 52 secured to this plunger. This adjusting movement of the index finger 52 will cause the plunger 41 to be screwed either into or out of the plunger hub 43 to vary the effective length of the plunger 41. The upper face of the shelf 42 is provided with a scale 52a for cooperation with the index 52, the scale 52a shown being numbered in degrees from 50 degrees up to 75 degrees.

The lower end of the plunger 41 moves downwardly as the outside temperature increases into engagement with the yieldable leaf spring 51. This spring is secured at its right-hand end 53 to the switch lever. The intermediate portion of this leaf spring 51 is supported by a pin 54 underneath it secured to the rock arm 22. The left-hand end of the leaf spring is held downwardly under tension by the pin 55 engageable with the upper face of the leaf spring 51 and secured to the rock arm 22.

The index finger 52 is set on the cooperating scale to indicate the outside temperature at which it is desired that the heat should be cut off. 65° F. is a heat cut-off point frequently chosen. Assuming that the outside temperature is below 65 degrees and rises to a temperature above 65 degrees, the bellows 13 will be caused to expand, pressing the switch arm 22 and switch 14 downwardly to cause the push button 26 to bear downwardly on the rock lever 27 to cause the opening of the switch to cut off the heat when the outside temperature reaches 65 degrees. Any downward movement of the left-hand end of the rock lever 27 below the horizontal is resisted by the engagement of the finger 29 with the under side of the rock arm 30. A continued rise in outside temperature above the 65-degree level would cause the plunger 41 to flex the leaf spring 51.

In a similar manner, if the outside temperature is above 65 degrees and the outside temperature drops to below 65 degrees, a reverse operation of the switch 14 will take place to release the push button 26 from effective engagement with the rock lever 27 to cause the switch to close and start the operation of the heater.

Referring to the second control means for effecting the on- and off-operation of the circulator pump, the switch 18 is turned on and off by changes in temperature of the circulating medium by means of the plunger 32 screw-threaded into the plunger hub 34 for up-and-down adjustment of the plunger. This screw-threaded adjustment is effected by means of an index finger 56 secured to the plunger for turning about its axis. The shelf 33 is provided with a temperature scale 57 running from 70° F. to 95° F. for cooperation with the index finger on the plunger. As indicated in this scale, the index 56 may be set at any figure between 70° F. and 95° F. Assuming that it is set at 75° F. and that the temperature of the heating medium is below 75 degrees and rises to a point above 75 degrees, the circulation pump 3 will be put in operation at the time at which the rising temperature of the fluid medium reaches 75 degrees and will continue to circulate fluid so long as the temperature of the heating medium remains above 75 degrees. The pitch of the thread of the thermometric plunger 32 is such that the switch 18 will be turned on or off, to control the starting and stopping of the circulator, at that figure on the dial at which the indicator 56 is set.

The third and fourth adjustments are concerned with the relative lengths of the effective lever arms of the rock lever 27.

Referring to the third adjustment, that of the switch 14 longitudinally of the switch rock arm 22, the proper setting for this apparatus involves the switch push button 26 which acts as an index for cooperation with a temperature scale 58 on the rock lever 27. The scale 58 adopted, ranges from 20 degrees below zero to 30 degrees above zero. The desired setting for the switch is determined to a great extent by the climate in which the apparatus is to be installed. If the apparatus is to be installed in a climate where the outside temperature may at times drop to as low as 20 degrees below zero, the switch 14 is adjusted to bring the push button 26 opposite the minus 20-degree mark on the scale. If it is to be used, for example, in the far south where the lowest outdoor temperature is not likely to get below 30 degrees, the push button 26 will be set opposite the 30-degree mark on the temperature scale. As shown, the push button 26 is set so as to be in alignment with about a 5-degree below zero temperature on the scale 58.

The variation in time of the change from "on" to "off" of the burner, and vice versa, is determined by the range of rocking movement of the push button 26, due to the rocking movement of the rock lever 27, effected by that depression of the rock arm 30 out of engagement with the push button 32a, occasioned by the downward movement of the circulator control plunger 32 due to a defined change in temperature of the circulating medium. If, as shown, the push button 26 is set for a cold climate with an expected minimum of 5 degrees below zero, the arcuate range of the push button 26 and switch 14 will be relatively great as compared with their arcuate movement if the push button were set to cooperate with an expected minimum temperature of 30 degrees. Therefore, for a given depression of the finger 29, due to the downward movement of the thermometric circulator plunger 32, the switch 14 would be raised considerably higher in a cold climate, with the push button index 26 set at 5° below zero, than it would in a warm climate, with index 26 set, for example, at 30 degrees above zero. The effective length of the burner switch lever arm 22 would be changed and also the effective length of the left-hand arm of the rock lever 27. The thermometric heat control plunger 41 would be placed in effective engagement with the leaf spring 51 to maintain the burner in on-condition, at an earlier stage and during a longer range of movement, of the thermometrically controlled rock arm 30, in the cold climate setting of the index than would be accomplished with a warmer climate setting. The thermometric plunger 41 is enabled to continue its downward movement on a rise of temperature after further downward movement of the burner control switch 14 is blocked by the rock arm 30, by bending the leaf spring 51 so that its left-hand end will move downward, away from the upper left-hand stop pin 55.

The fourth temperature control adjustment comprises the finger 29 engageable with the lower face of the rock arm 30 and slidably mounted on the right-hand arm of the rock lever 27 by means of a channel portion 59 straddling the rock lever 27. This channel portion 59 is held in longitudinal adjusted position by means of a set screw 60 extending through a slot 61 in the channel portion 59 and threaded into the lever 27. The lever is provided with a temperature indicating scale 62, running from 50 degrees to 140 degrees, for cooperation with the index finger 29. The setting of this index finger 29 determines the relative lengths of the lever arms of the rock lever 27 and rock arm 30. The general effect on the operation of the switch 14 is similar to that described in connection with the third adjustment.

*Résumé*

The regulator is a thermostatic control device for regulating the heating or cooling of a building. It functions to change the temperature of the circulating medium of the heating or cooling system in accordance with changes in outdoor temperature.

A simple form of such application is that in conjunction with a hot water heating system. In such a system, one temperature sensitive bulb 5 of the regulator is placed outdoors where it measures the outdoor temperature.

The second temperature sensitive bulb 6, usually referred to as the system bulb, is installed in the hot water piping system 10 of the heating system.

As the outdoor temperature changes, gets colder for example, the liquid in the outdoor temperature sensitive bulb 5 contracts, causing a contraction of the bellows 13 in the control unit.

As the bellows 13 contracts, the coil spring 47 around the bellows draws the yoke 46, located at the underside of the bellows 13, upward. As this plunger 46 moves upward, the switch lever arm 22 is permitted to rise, releasing the pressure of the switch actuator 27 on the switch 14 controlling the generation of heat.

The switch 14 used is a single pole, double throw, type of snap switch, and in its use in this application, as the pressure of the switch actuator 27 on the switch 14 is released, the switch closes the circuit to the heat generator, such as the oil burner, the gas burner, or motorized valve, causing the admittance of heat into the heating system 1.

As heat units are admitted into the water of the heating system 1, usually by the operation of the burner 2, the temperature of the water surrounding the system bulb 6 of the controller will be raised. As this temperature rises, the liquid in the system temperature responsive bulb 6 expands, causing an expansion of the system bellows 17 and a lowering of the plunger 32 at the end of this bellows. As this plunger 32 is lowered it lowers the rock arm 30 at the underside of the lower right-hand flange 33. This, in turn, lowers the switch actuator lever 27 to the right of the pivot 28, pressuring the switch 14 into an open position.

The colder the temperature gets outdoors the more the outdoor temperature bellows 13 contracts, and the higher the plunger 41 is raised. The higher the plunger 41 is raised, the higher the temperature of the circulating water must rise in order to expand the system bellows 17 sufficiently to lower the plunger 32, the rock arm 30, and the right-hand portion of the switch operator lever 27 in order to shut the burner off.

In this way the switch operating lever 27 acts as a balancing lever to balance the circulating water temperature with every change of outdoor temperature.

The second switch 18 at the right which is actuated by the rock arm 30 is the circulator control switch for controlling the operation of the water circulator in a hot water heating system.

A single pole, single throw switch of the normally closed type is used which functions to close the switch 18 to the circulator when the pressure on the push button 32a is released.

As the burner control switch 14 operates the burner 2 so as to introduce into the circulating water of the heating system useful and transferable heat units, the liquid in the system bulb 6 and the bellows 17 expands, causing the plunger 32 to release the pressure of the spring rock arm 30 on the switch button 32a and thus causing the circulator 3 to operate.

As long as the circulating water is sufficiently warm so that the plunger 32 holds the rock arm 30 off of the circulator switch 18, the circulator continues to function.

As outdoor temperatures get warmer, the liquid in the outdoor thermally responsive bulb 5 expands, expanding the bellows 13 and forcing the outdoor system plunger 41 downward, lowering the burner control switch 14 against the operation lever arm 27.

As the burner push button 26 is depressed, the burner is shut off and the circulating water is gradually cooled by the transmission of heat units from the circulating water to the space being heated. When this circulating water cools sufficiently to permit the right-hand portion of the switch operating lever arm 27 to rise sufficiently to release the pressure from the push button 26 on the burner control switch 14, the burner starts once again.

When the temperature outdoors rises to the point where no further heat units need be supplied to the building, which is normally at the 65-degree level, or to such a point that the push button 26 of the switch will be continuously depressed by the switch operating lever 27, at this point the lever arm 27, which is positioned by the system plunger 32, is as high up as it can go. Therefore, at this 65-degree outdoor temperature level and all temperatures higher thereof, the burner 2 will not be operated.

As outdoor temperatures rise above the 65-degree level, the lowering of the outdoor system plunger 41 continues; however, this motion is absorbed by the lost-motion leaf spring 51 mounted on the switch-carrying lever arm 22.

Adjustment of the unit to the characteristics of the heating system is as follows:

It will be noted that by loosening the two screws 23a holding the burner control switch 14 in place, the switch may be shifted to the right or to the left. It should be positioned so that the pin 26 of the switch 14 is opposite that part of the scale 58 on the rock lever 27 which indicates the coldest anticipated outdoor temperature in the area in which the control is installed, with the thought that as this coldest outdoor temperature is approached, the hottest circulating water will be circulated.

Once the switch 14 is positioned, the screws 23a should be tightened. Next, the screw 60 on the switch operating lever 27 to the right of the pivot 28 should be loosened and the follower finger 29 moved to the setting indicated for the desired system temperature rise or range.

The system temperature rise means the rise in the circulating water temperature desired when the outdoor temperatures drop from the high level of 65 degrees down to the "design" or lowest anticipated outdoor temperature. Once set, the follower 29 is secured in place.

The temperature level at which it is decided the circulator 3 should be caused to function is secured by loosening the set screw in the hub 34 of the heating system plunger 35 and then rotating the pin indicator 56 on the plunger 32 to the desired temperature as indicated on the scale 57 shown on the upper face of the lower right-hand flange 33.

This setting may vary from a 70-degree setting in a radiant floor type panel heating system to a 90-degree or 95-degree setting where copper convector radiators are used, or where the circulator switch is to be used to operate a fan of a warm air heating system.

Rotating this plunger 32 causes it to be screwed into or out of the plunger hub 34. This raises or lowers the end position of the plunger 32. Once properly positioned the set screw in the hub 34 should be tightened.

The outdoor temperature level at which the burner switch 14 can no longer call for heat is determined by loosening the set screw in the hub 43 and rotating the plunger 41 of the outdoor temperature system.

The desired adjusted position should be indicated by the pin 52 in the plunger 41 as shown on the scale 52a on the upper face of the lower left-hand flange 42.

This may be lowered to 50 or 55 degrees where a garage or warehouse is to be heated; to 60 degrees where a radiant floor type panel system is used, or to 65 or 68 degrees where the ordinary type of system in the usual building is used.

It will be noted that the sum of the temperature setting at which the circulator starts, as indicated by the pointer 56 on the scale 57, and the setting indicated on the range of temperature rise or system temperature rise dial 62, will indicate the highest temperature of water that will be circulated at the coldest outdoor weather condition as is indicated on the "design" or lowest outside temperature scale setting 58.

In an installation where the circulator switch 18 is not needed, as in a gravity type hot water or warm air heating system, the switch may be omitted from the control unit, and where such a switch is omitted, the upward movement of the lever arm 30 is limited by the web 63 at the left-hand edge of the bottom flange 33 of the system assembly.

In a steam heating system, the expansible bellows 17 may be subjected to the pressure condition within the heating system instead of to the temperature of the heating medium, with the resultant effect being to regulate temperatures within the space by changing the pressure of steam supplied to the heating system as temperatures outdoors change.

Further modifications will be apparent to those skilled in the art and it is desired, therefore, that the invention be limited only by the scope of the appended claims.

Having thus described my invention, what I claim and desire to secure by Letters Patent is:

1. Heat transfer control means comprising a plurality of thermally responsive expansive elements each mounted in fixed relationship with a lever arm, a switch mounted on one of said lever arms and arranged for movement toward and away from a switch actuator, the switch being opened or closed by changes in the position of the switch actuator caused by the expansion or contraction of one of said thermally responsive expansive elements.

2. Heat transfer control means comprising a plurality of thermally responsive expansive elements each mounted in fixed relationship with a lever arm, a switch mounted on one of said lever arms and arranged for movement toward and away from a switch actuator, the switch being opened or closed by changes in the position of the switch carrying lever arm caused by the expansion or contraction of one of said thermally responsive elements.

3. Heat transfer control means comprising a plurality of thermally responsive expansive elements each mounted in fixed relationship with a lever arm, a switch mounted on one of said lever arms and arranged for movement toward and away from a switch actuator, the switch being opened or closed by changes in the position of the switch carrying lever arm or changes in the position of the switch actuator or by changes in the position of both the switch actuator and the switch carrying lever arm caused by the expansion or contraction of said thermally responsive elements.

4. Heat transfer control means comprising a plurality of expansive elements responsive to a condition, each mounted in fixed relationship with a lever arm, a switch mounted on one of said lever arms and arranged for movement toward and away from a switch actuator, the switch being opened or closed by the expansion or contraction of one of said thermally responsive elements, and adjustment means between the thermally responsive expansive element and the switch lever to vary the point of opening and closing of the switch.

5. Heat transfer control means comprising a plurality of thermally responsive expansive elements each mounted in fixed relationship with a lever arm, a switch mounted on one of said lever arms and arranged for movement toward and away from a switch actuator, the switch being opened or closed by changes in the position of the switch actuator caused by the expansion or contraction of one of said thermally responsive expansive elements, and adjustment means between the thermally responsive expansive element and the switch actuator to vary the point of opening and closing of the switch.

6. Heat transfer control means comprising a snap switch, a lever mounted for rotation around a fixed pivot, one end of which actuates the snap switch, the position of which is determined by a thermally responsive expansive element, rotation of the lever actuator being caused by movement of a free moving arm in contact with the other end of the lever, movement of the free moving arm being caused by an expansive element responsive to a condition, and opening or closing action of the switch being produced by expansion or contraction of either of the expansive elements.

7. Heat transfer control means comprising a snap switch, a lever mounted for rotation around a fixed pivot, one end of which actuates the snap switch, the position of which is determined by a thermally responsive expansive element, rotation of the lever actuator being caused by movement of a free moving arm in contact with the other end of the lever, movement of the free moving arm being caused by an expansive element responsive to a condition, opening or closing action of the switch being produced by expansion or contraction of either of the expansive elements, and adjustment means between the expansive element and the free moving arm to vary the point of opening and closing of the switch.

8. Heat transfer control means comprising a snap switch, a lever mounted for rotation around a fixed pivot, one end of which actuates the snap switch, the position of which is determined by a thermally responsive expansive element, rotation of the lever actuator being caused by movement of a free moving arm in contact with the other end of the lever, movement of the free moving arm being caused by an expansive element responsive to a condition, opening or closing action of the switch being produced by expansion or contraction of either of the expansive elements, and adjustment means between the free moving arm and the lever to vary the point of opening and closing of the switch.

9. Heat transfer control means comprising a snap switch, a lever mounted for rotation around a fixed pivot, one end of which actuates the snap switch, the position of which is determined by a thermally responsive expansive element, rotation of the lever actuator being caused by movement of a free moving arm in contact with the other end of the lever, movement of the free moving arm being caused by an expansive element responsive to a condition, opening or closing action of the switch being produced by expansion or contraction of either of the expansive elements, and adjustment means between the thermally responsive expansive element and the snap switch to vary the point of opening and closing of the switch.

10. Heat transfer control means comprising a snap switch, a lever mounted for rotation around a fixed pivot, one end of which actuates the snap switch, the position of which is determined by a thermally responsive expansive element, rotation of the lever actuator being caused by movement of a free moving arm in contact with the other end of the lever, movement of the free moving arm being caused by an expansive element responsive to a condition, opening or closing action of the switch being produced by expansion or contraction of either of the expansive elements, and means for varying the position of the snap switch relative to the pivot of the lever to vary the point of opening and closing of the switch.

11. Heat transfer control means comprising a lever mounted for rotation about a fixed pivot, two expansive elements responsive to a condition mounted in spaced relationship with the lever pivot, one of which expansive elements positions one end of the lever, a pressure responsive switch, said switch being mounted on a movable arm and lying between said lever and the second expansive element, opening or closing action of the switch being produced by action of either of the expansive elements.

12. Heat transfer control means comprising a lever mounted for rotation about a fixed pivot, two expansive elements responsive to a condition mounted in spaced relationship with the lever pivot, one of which expansive elements positions one end of the lever, a pressure responsive switch, said switch being mounted on a movable arm and lying between said lever and the second expansive element, opening or closing action of the switch being produced by action of either of the expansive elements, and means for varying the position of the switch relative to the lever pivot.

13. Heat transfer control means comprising a lever mounted for rotation about a fixed pivot, two expansive elements responsive to a condition mounted in spaced relationship with the lever pivot, one of which expansive elements positions one end of the lever, a pressure responsive switch, said switch being mounted on a movable arm and lying between said lever and the second expansive element, opening or closing action of the switch being produced by action of either of the expansive elements, and adjustment means for varying the movement of the lever with relation to the expansion of the expansion member.

14. Heat transfer control means comprising a lever mounted for rotation about a fixed pivot, one end of the lever actuating a snap switch which is mounted on a floating lever, a thermally responsive expansive element, the movement of which causes a movement of the switch toward or away from the lever actuator, an expansive element responsive to a condition, the expansion or contraction of which positions a lever arm, one end of which arm actuates a second snap action switch and further positions the rotatable arm so as to control the point of opening or closing of the lever mounted snap switch.

15. Heat transfer control means comprising a lever mounted for rotation about a fixed pivot, one end of the lever actuating a snap switch which is mounted on a floating lever, a thermally responsive expansive element, the movement of which causes a movement of the switch toward or away from the lever actuator, an expansive element responsive to a condition, the expansion or contraction of which positions a lever arm, one end of which arm actuates a second snap action switch and further positions the rotatable arm so as to control the point of opening or closing of the lever mounted snap switch, and adjustment means between the lever arm and the expansive element for varying the point of opening or closing of the second snap switch.

16. Heat transfer control means comprising a lever mounted for rotation about a fixed axis, one end of the lever positioned by an expansive element responsive to a condition, the other end actuating a switch which is mounted on a floating arm, a thermally responsive expansive element positioning the floating arm, and lost motion means between the floating lever arm and the expansive element.

References Cited in the file of this patent
UNITED STATES PATENTS

| | | |
|---|---|---|
| 2,249,418 | Chambers | July 15, 1941 |
| 2,297,706 | Jehle et al. | Oct. 6, 1942 |
| 2,502,556 | Cobb | Apr. 4, 1950 |
| 2,549,054 | Burling | Apr. 17, 1951 |